United States Patent [19]

Sakai et al.

[11] 3,994,746

[45] Nov. 30, 1976

[54] SILVER PEROXIDE CELL

[75] Inventors: Tsugio Sakai; Toyoo Harada, both of Tokyo, Japan

[73] Assignee: Kabushiki Kaisha Daini Seikosha, Japan

[22] Filed: June 6, 1975

[21] Appl. No.: 584,343

[30] Foreign Application Priority Data

June 8, 1974 Japan.............................. 49-64567

[52] U.S. Cl. ............................................. 429/219
[51] Int. Cl.² ........................................ H01M 43/00
[58] Field of Search................. 136/20, 120 R, 107, 136/111, 83, 24, 30, 28

[56] References Cited
UNITED STATES PATENTS

| | | |
|---|---|---|
| 2,811,572 | 10/1957 | Fischbach et al................. 136/20 X |
| 2,849,519 | 8/1958 | Freas et al. ........................... 136/20 |
| 3,082,278 | 3/1963 | Doyen............................... 136/20 X |
| 3,447,967 | 6/1969 | Hagarman............................. 136/20 |
| 3,630,780 | 12/1971 | Berndt et al. ......................... 136/20 |
| 3,854,999 | 12/1974 | Thornton.............................. 136/20 |

Primary Examiner—Anthony Skapars
Attorney, Agent, or Firm—Robert E. Burns; Emmanuel J. Lobato; Bruce L. Adams

[57] ABSTRACT

A silver peroxide cell comprises in combination: a cathode member which is composed of a powder of silver peroxide as active material, an alkali resistant metal mesh member coated with at least one metal which deoxidizes the powder of peroxide in the electrolyte and constitutes a local cell, at least a part of said alkali resistant metal mesh member is embedded into a part or all of the surface of said cathode member, whereby a long life and a flat single discharge voltage is easily obtained.

4 Claims, 2 Drawing Figures

SILVER PEROXIDE CELL

BACKGROUND OF THE INVENTION

This invention relates to a silver peroxide cell, especially, having a cathode member which is composed of a powder of silver peroxide.

In conventional type of alkali-cell, said cell which is composed of the cathode using active material of silver peroxide, the anode, using zinc or cadmium is known in the prior art.

However, for example, in the alkali-cell which is composed of zinc and cathode active material using of silver peroxide, a high discharge voltage (1.8 volt) of said silver peroxide is obtained in the initial discharge stage, which then falls to 1.5 volts, as the result, the discharge voltage of two stages are obtained. Such cells are unsuitable for constant voltage sources. It has been suggested that the cells have a cathode which is composed of silver peroxide which is coated with a layer of monovalent silver oxide as means of eliminating the above drawback.

In this manner, the monovalent silver oxide of the cathode provides the voltage regulation reaction of the cell, this cell gives the discharge voltage of 1.5 volt in combination with an anode of zinc; the silver metal resulting from the discharge of the monovalent silver oxide is re-oxidized by the silver peroxide in said cathode whereby a long life and a single flat discharge voltage is easily obtained.

But, this method of making the compound cathode member is attained by mechanically pressing, forming and coating the powder of monovalent silver oxide onto the surface of the pellet of the powder of silver peroxide which is first mechanically pressed and formed.

Therefore, in order to obtain a high stability, capacity and performance of the cell, there are many production problems and it is not very economical to make.

OBJECTS OF THE INVENTION

The present invention aims to eliminate the above noted difficulties and drawbacks.

It is the primary object of the present invention to provide a silver peroxide cell having a substantially constant single stage discharge voltage from an economic efficient and useful cathode of silver peroxide.

The another object of the present invention is to provide the silver peroxide cell based upon the high efficiency discharge of silver peroxide and having low internal resistance.

SUMMARY OF THE INVENTION

According to the present invention, there is provided a silver peroxide cell comprising in combination: a cathode member which is composed of a powder of silver peroxide as cathode active material, an alkali resistant metal mesh member which is coated with at least one metal which deoxidizes the silver peroxide in the presence of electrolyte and constitutes a local with said silver peroxide; at least a part of said alkali resistant metal mesh member being embedded into a part or all of the surface of said cathode member, whereby a long life and a flat single stage discharge voltage is easily obtained.

DETAILED DESCRIPTION OF THE INVENTION

This invention relates to a silver peroxide cell which is composed of the electrolyte using alkali aqueous solution; the cathode using a powder of silver peroxide; and the anode using zinc or cadmium.

Figure 1:
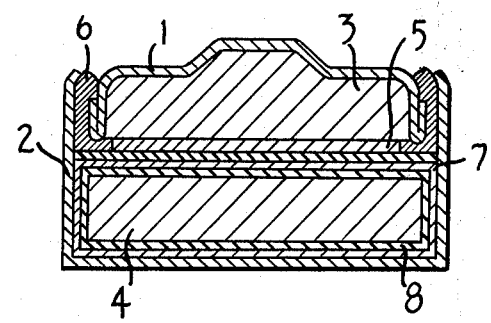
FIG. 1 shows a sectional view of the cell which having the silver peroxide cathode member in which the circumference surface is coated by the silver metal or the monovalent silver oxide after shaping and which includes the coated mesh member according to this invention.

Referring now to the embodiment accompanying drawings in which, FIG. 1 shows the sectional view of the cell comprising anode can 1, cathode can 2, the anode active material 3 which may be composed of amalgamated zinc, the cathode 4 which is composed of the cathode-active powder of silver peroxide, the separator which is composed of the diaphragm and an absorbent layer including and containing electrolyte, an insulating packing member 6, an alkali resistant metal mesh 7 which is coated with the deoxidizing Zn or Cd, and the silver metal layer 8 formed by the reaction the local cell.

The cathode member 4 is obtained by mixing cathodic powder mix including silver peroxide and 3 weight % of graphite for conductivity. The mixed powder is pressed at a pressure of 4 ton/cm$^2$ to form the cathode pellets which are cathode member 4.

Said cathode member 4 is inserted into cathode can 2 with a pressure of 8 ton/cm$^2$. Before pressing cathode member 4 into cathode can 2, an alkali resistant stainless steel mesh 7 (200 mesh), wherein the diameter of the openings of said stainless steel mesh correspond to holes in which a wire having diameter of 74 micron ($\mu$) can pass, coated preferably by vacuum evaporation, with Zn or Cd metal of 2 or 3 micron ($\mu$) thickness, is positioned on cathode member 4. The pressure of 8 ton/cm$^2$ is then applied to form the cathode assembly in cathode can 2.

As a result at least one part of said metal mesh 7 is embedded to the surface of said cathode member 4.

Then, said separator 5 is positioned on top of cathode can 2 which is filled with said cathode member 4, and alkali-electrolyte is inserted into the absorbant layer of separator 5 on said cathode can 2, and the cell assembly is completed by caulking and sealing said anode can 1, via the packing 6, to cathode can 2. Anode can 2 had been previously filled by the anode material 3 of zinc (Zn) or cadmium (Cd).

Figure 2:
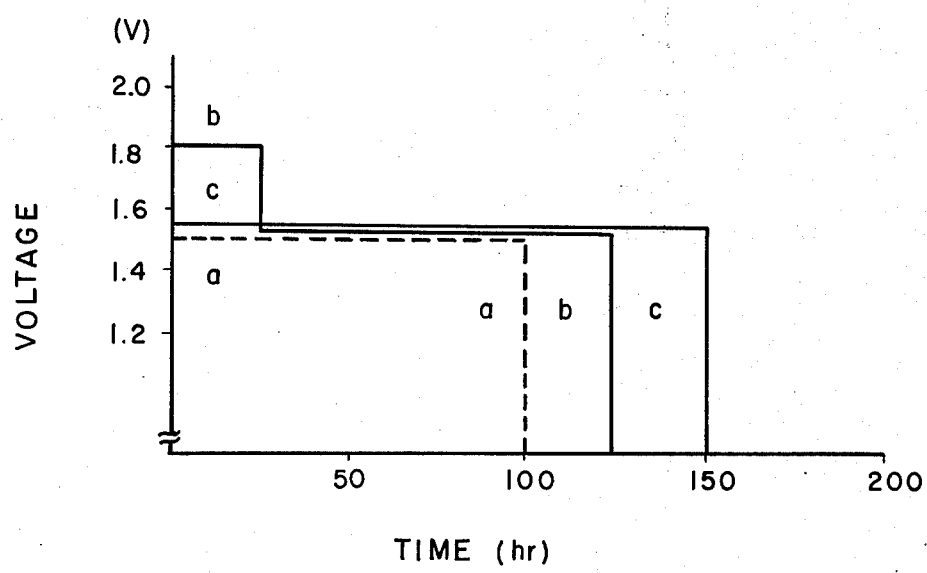
FIG. 2 shows a graph of the data of the continuous discharge testing at a constant discharge resistance of 1.5 K $\Omega$ between cells of the present invention and conventional type cells.

The discharge characteristics of the cell by the above construction is indicated in "C" of FIG. 2, it indicates that the voltage is the flat voltage of 1.5 volt with one stage and further the capacity is almost 1.5 times that of the monovalent silver oxide cell of the conventional type as indicated a.

A current collecting effect is also obtained by embedding said metal mesh 6 into said cathode member, and a significant reduction of the inner resistance of the cell is obtained.

Comparison data of the average inner resistance based upon measurements of 100 cells of the present invention and the conventional cells is as follows:

| | |
|---|---|
| The cell of present invention type | 4.7 Ω |
| The cell of conventional silver peroxide type | 19.2 Ω |

According to the present invention, the alkali metal mesh is coated by vacuum evaporation with the deoxidizing metal such as zinc, and at least one part of said metal mesh 7 is embedded to the circumference of said cathode member, whereby said metal mesh with zinc constitutes the local cell, and said zinc is oxidized to the zinc oxide, the silver peroxide of the surface layer is deoxidized to the silver metal and/or the monovalent silver oxide.

Therefore, the circumference region of said silver peroxide cathode member adjacent or near said coated mesh member is substantially coated by said silver metal or said monovalent silver oxide, then first discharge voltage of 1.5 volt of said monovalent silver oxide is obtained, further said metal mesh acts also as a current collector and this action results in the reduction of the internal resistance of the cell.

According to another experiment, it is confirmed that the same effect as with zinc is obtained by the metal mesh which is coated with metallic Cd, Pb, Cu and Ag.

Suitable methods for coating the alkali resistant mesh include vacuum evaporating, sputtering and plating.

The useful thickness of the coating can range from 2 to 15 microns with 2 to 5 micron ($\mu$) being preferred.

The present invention thus provides a silver peroxide cell which can be prepared and assembled by a simple method and is very economical to manufacture, which has considerable industrial value as it provides a highly efficient constant voltage source of high capacity.

What we claim is

1. A silver peroxide cell comprising in combination: an anode member, a cathode member and an alkaline electrolyte; said cathode member comprising silver peroxide in contact with an alkali-resistant metal mesh member coated with at least one metal which deoxidizes the silver peroxide in the presence of electrolyte and constituting a local cell with said silver peroxide, at least a part of said alkali-resistant metal mesh member being embedded into a part or all of the surface of said cathode member.

2. A silver peroxide cell according to claim 1; wherein said alkali-resistant metal mesh member is coated with at least one silver peroxide-deoxidizing metal selected from the group consisting of Zn, Cd, Pb, Cu and Ag.

3. The cell according to claim 1 wherein said coated alkali-resistant mesh member is in contact with said cathode and the electrolyte, said electrolyte being absorbed in a separator element, the thickness of said coating being in the range 2 to 5 microns.

4. The cell according to claim 3 wherein said separator element is juxtaposed between said anode member and said cathode member and is saturated with said electrolyte.

* * * * *